Patented Aug. 5, 1941

2,251,558

UNITED STATES PATENT OFFICE 2,251,558

DYESTUFFS OF THE DIBENZANTHRONE SERIES AND PROCESS OF MAKING THEM

Myron S. Whelen, Wilmington, Del., assignor to E. I. du Pont de Nemours & Company, Wilmington, Del., a corporation of Delaware No Drawing. Application November 29, 1939, Serial No. 306,697

8 Claims. (Cl. 260—354)

This invention relates to the preparation of new dyestuffs of the dibenzanthrone series and Process of Making Them.

The preparation of dyestuffs by the nitration of dibenzanthronyls and their subsequent fusion and reduction to amino derivatives is well known. These dyes, however, some of which have been very valuable colors from a commercial standpoint, do not meet the ever increasing demands with respect to fastness of dyes of the vat dye class and a great deal of time, effort and money have been expended in the attempt to obtain improved black dyestuffs in the vat dye class.

It is known that in the fusion of the dibenzanthronyls to dibenzanthrone the nitrogen contained in the molecule in the form of nitro- or amino-groups is split out to a greater or less extent depending upon the conditions employed, and that the loss of this nitrogen usually results in loss of desirable properties in regard to color, fastness or the dyeing properties of the resulting dyestuffs.

Direct nitration of dibenzanthrone gives a green vat dye which requires an oxidation treatment to convert it to a black dyestuff, so that any attempt to bring up the nitrogen content of the amino-dibenzanthronyl fusion product by direct nitration changes the dyeing characteristics of the dyestuff as well as its shade.

It is therefore an object of this invention to prepare new and valuable gray to black dyestuffs of the dibenzanthrone series which show improved fastness properties over those previously known.

It is a further object of the invention to prepare dibenzanthronyl compounds containing tertiary amino groups which are valuable dyestuff intermediates; and to prepare tertiary amino dibenzanthrone compounds which dye cotton from the usual alkaline hydrosulfite vats in gray to black shades of improved fastness properties over the previously known black dyes of the dibenzanthrone series.

I have found that improved black dyestuffs of the dibenzanthrone series can be prepared by reacting nitrodibenzanthronyls with secondary alkylamines, whereby the nitro groups are replaced by tertiary amino groups, and then ring closing the dibenzanthronyls by the known methods. The new tertiary aminodibenzanthrones are fast to water spotting and show improved light fastness. Those prepared from the Bz-1,Bz-1'-dibenzanthronyls have especially good building up properties making them valuable for printing and dyeing in black shades.

The nitrodibenzanthronyls may be prepared by any of the known methods. The replacement of the nitro-groups by the secondary alkylamines is preferably carried out in a solvent, such as in butanol, or mono ethyl ether of ethylene glycol, pyridine, etc., or in an excess of the alkylamine, at elevated temperatures. The bis-dialkylamino-dibenzanthronyls are then ring closed to the dibenzanthrone compound by any of the methods suitable for ring closing the particular unsubstituted dibenzanthronyls.

Where caustic alkalies are employed to effect the ring closure either caustic potash or caustic soda or a mixture may be used, with methyl, ethyl, butyl alcohol, or similar alcohol, or the reaction may be carried out in naphthalene, pyridine, aniline, etc., as disclosed in the prior art for the fusion of benzanthrone and dibenzanthronyls to dibenzanthrone. The caustic alcoholates may also be employed with the organic solvents such as solvent naphtha, naphthalene, pyridine, etc.

In the ring closure of the Bz-1,Bz-1'-dibenzanthronyl derivatives, I have found that temperatures as high as 180° C. give products of high tinctorial power. The lower temperatures such as 90–100° C. heretofore disclosed as particularly suitable for ring closing Bz-1,Bz-1'-dibenzanthronyls may of course be employed although the higher temperatures produce black dyes which exhibit increased tinctorial power.

The following examples are given to illustrate the invention. The parts used are by weight:

Example 1

200 parts of dinitro-Bz-1,Bz-1'-dibenzanthronyl (prepared by direct nitration of Bz-1,Bz-1'-dibenzanthronyl in nitrobenzene) and 450 parts of a 20% solution of dimethylamine in pyridine (20% dimethylamine, 80% pyridine) are heated together in an autoclave at 120 to 140° C. for 10 to 20 hours. On cooling the product is most conveniently isolated in almost quantitative yields by subjecting the reaction mass to distillation with steam whereby the pyridine is removed, after which the charge is made slightly acid with mineral acid, filtered and the product is washed free from acid. On drying there is obtained a dark brown powder containing 5.21% nitrogen, and dissolving in concentrated sulfuric acid with a deep cherry-red color. It is further characterized by being almost completely soluble in sulfuric acid of 76% strength, while the starting material is almost completely insoluble in this strength of acid.

The product as above described may be isolated in somewhat lower yield by directly filtering the reaction mass to remove pyridine.

The bis-dimethylamino-Bz-1,Bz-1'-dibenzanthronyl as obtained above by steam distillation may be further purified if desired by dissolving it in ten times its weight of concentrated sulfuric acid, diluting to an acid concentration of 75 to 76% followed by filtration. The insoluble portion, which represents 5 to 12% of the crude material, is largely unreacted dinitro-Bz-1,Bz-1'-dibenzanthronyl. The purified bis-dimethylamino-Bz-1,Bz-1'-dibenzanthronyl is obtained by pouring the filtrate into water, filtering and washing the product free of acid and drying. On analysis it shows a nitrogen content of 5.14% (Theory for this product is N-5.14%).

*Example 2*

150 parts of solvent naphtha, 25 parts of ethyl alcohol and 75 parts of flaked potassium hydroxide are heated together to 90° C. When the melt is smooth the mass is cooled to 83° C. and 50 parts of bis-dimethylamino-Bz-1,Bz-1'-dibenzanthronyl, prepared by the method shown in Example 1, are slowly added at 85 to 88° C. during a one hour period. The reaction mass is then heated at 88 to 90° C. for twenty hours. It is then steam distilled to remove the solvent naphtha and the resulting suspension is aerated to oxidize the leuco body to the dyestuff which is filtered off and washed free from alkali with water. The dyestuff may be used as an aqueous paste or dried. The dyestuff is essentially a bis-dimethylamino-dibenzanthrone. When dry it is a dark powder, which dyes cotton from a violet vat with red fluorescence in gray to black shades, possessing excellent fastness towards light, bleaching, and the usual reagents. Analysis shows it to contain 4.96% nitrogen. ((Theory= 5.16%.)

*Example 3*

200 parts of dinitro-Bz-1,Bz-1'-dibenzanthronyl and 450 parts of a 20% solution of dimethylamine in ethyl alcohol are heated together under pressure at a temperature of 110 to 135° C. for 20 hours. The product is isolated by filtering the reaction mass directly or after drowning in water. After washing and drying there is obtained a dark brown powder which may be purified in a manner analogous to that shown in Example 1, if desired. This product is identical with the product of Example 1.

*Example 4*

To 180 parts of n-butyl alcohol heated to 110° C. there are slowly added 225 parts of flaked potassium hydroxide. The melt is then heated to 170° C., and 75 parts of bis-dimethylamino Bz-1,Bz-1'-dibenzanthronyl (prepared as in Example 1) are added over one half hour at a temperature of 170 to 180° C., and a temperature of 175° C. is then maintained for a further two hours. The fusion mass is then poured into 6000 parts of water, heated to 80° C. with stirring and filtered when oxidation is complete. The product so obtained is washed free of alkali and dried. It is a black powder which dyes cotton from a red-violet colored alkaline hydrosulphite vat in gray to black shades. By analysis it contains 4.95% nitrogen.

*Example 5*

To 150 parts of ethyl alcohol are added 100 parts of flaked potassium hydroxide. The mixture is then heated to 125° C. for one half hour to give a melt and the temperature is then lowered to 90° C. At 90° C. there are then added gradually over one half hour 50 parts of bis-dimethylamino Bz-1,Bz-1'-dibenzanthronyl. The mass is agitated at a temperature of 90° C. for twenty hours, after which the fusion mass is poured into 6000 parts of water. It is then heated to 80° C. with vigorous stirring to promote oxidation, and filtered at 80° C. when oxidation is complete. The cake is washed with water until free from alkali. The product when dry is a black powder having a nitrogen content of 4.94%. It dyes cotton in gray to black shades from a reddish-violet colored alkaline hydrosulphite vat.

*Example 6*

200 parts of dinitro-Bz-1,Bz-1'-dibenzanthronyl, and 450 parts of 20% diethylamine pyridine solution (20% diethylamine, 80% pyridine) are heated together in an autoclave at 120 to 135° C. for 20 hours. The bis-diethylamino-Bz-1,Bz-1'-dibenzanthronyl formed is isolated by filtration after drowning the charge in water or dilute mineral acid or after steam distilling the charge to remove pyridine and acidification. It is a light brown powder, soluble in concentrated sulfuric acid with a cherry-red color and has a nitrogen content of 5.21%.

*Example 7*

200 parts of dinitro-Bz-1,Bz-1'-dibenzanthronyl, 90 parts of dibutylamine, and 360 parts of pyridine are heated together in an autoclave at 135° C. for 20 hours. The reaction product is isolated as in Example 6. It is a brown powder soluble in concentrated sulfuric acid with a reddish-orange color and has a nitrogen content of 5.24%.

*Example 8*

200 parts of dinitro-Bz-1,Bz-1'-dibenzanthronyl, 150 parts of a binary mixture of dimethylamine and trimethylamine (being approximately 65% dimethylamine) and 300 parts of pyridine are heated in an autoclave at 135° C. for 20 hours. The bis-dimethylamino-Bz-1,Bz-1'-dibenzanthronyl so formed is isolated as in Example 3. The product has a nitrogen content of 5.17% and is substantially identical with the product of Example 1. The trimethylamine employed in this reaction serves as part of the reaction medium.

*Example 9*

200 parts of dinitro Bz-1,Bz-1'-dibenzanthronyl, 100 parts of diethanolamine and 300 parts of pyridine are heated in an autoclave at 135° C. for 20 hours. The bis-diethanolamino-Bz-1,Bz-1'-dibenzanthronyl so formed is isolated by drowning the reaction mass in water, filtering and washing. It is a brown powder, dissolving in concentrated sulphuric acid with a brownish red coloration. It has a nitrogen content of 4.43%. (Theory=4.23%.)

*Example 10*

180 parts of n-butyl alcohol are heated to 110° C., and 225 parts of flaked caustic potash are slowly added. The mass is then heated to 170° C., and 75 parts of bis-diethanolamino-Bz-1,Bz-1'-dibenzanthronyl (of Example 9) are added at a temperature of 170-180° C. over one half hour. A temperature of 175° C. is maintained for two hours. The charge is then drowned in 6000 parts of water, then heated to 80° C. under vigorous stirring to promote oxidation, and filtered when oxidation is complete. The cake is washed free of alkali and dried. It is a black powder dyeing cotton in gray to black shades from a violet alkaline hydrosulphite vat. It has a nitrogen content of 4.17% and is essentially a bis-diethanolamino dibenzanthrone.

*Example 11*

200 parts of dinitro-Bz-1,Bz-1'-dibenzanthronyl and 450 parts of a 20% solution of dimethylamine in pyridine (20% dimethylamine, 80% pyridine) are heated together in an autoclave at 135° C. for 20 hours. To the reaction mass there are added, at a temperature of 25–75° C. 200 parts of ethyl alcohol followed by 300 parts of flaked potassium hydroxide. The mass is then heated at 88 to 90° C. for twenty hours (a shorter period of heating may be employed with equally good results), after which the product formed is isolated by pouring the charge into ten thousand parts of water followed by oxidation with air, filtration and washing, or by subjecting the reaction mass to steam distillation to remove pyridine followed by air oxidation, filtration and washing. The dyestuff so isolated is substantially identical to the product obtained in Example 2.

This reaction may be carried out in the same manner using butyl alcohol as the diluent, in which case no ethyl alcohol need be added in the caustic fusion step.

*Example 12*

200 parts of dinitro-Bz-1,Bz-1'-dibenzanthronyl and 450 parts of a 20% solution of diethylamine in pyridine (20% diethylamine, 80% pyridine) are heated together in an autoclave at 135° C. for 20 hours. To the reaction mass there are added, at room temperature 200 parts of ethyl alcohol followed by 300 parts of flaked potassium hydroxide. The whole is then heated at 88–90° C. for 16 hours. The dyestuff which is essentially a bis-diethylamino-dibenzanthrone is isolated in a manner analogous to that shown in Example 11. It has a nitrogen content of 5.04%.

Instead of the diethylamine used in the foregoing example, dibutylamine may be utilized, in which case the resulting product is the bis-dibutylamino-dibenzanthrone. It dyes cotton from a reddish-blue vat in gray to black shades.

*Example 13*

200 parts of dinitro-2,2'-dibenzanthronyl (prepared by nitrating 2,2'-dibenzanthronyl in nitrobenzene) and 450 parts of a 20% solution of dimethylamine in pyridine solution are heated together in an autoclave at 120 to 135° C. for 20 hours. The reaction mass is then subjected to steam distillation to remove the pyridine. The bis-dimethylamino-2,2'-dibenzanthronyl is isolated by filtration after first acidifying, followed by washing with water. It may also be isolated by direct filtration of the reaction mass followed by washing with water. It is a dark brown powder dissolving in concentrated sulfuric acid with a brown coloration. It gives a nitrogen analysis of 5.86%. If desired, it may be purified from sulfuric acid in a manner analogous to that described in Example 1.

*Example 14*

200 parts of dinitro-2,2'-dibenzanthronyl, and 450 parts of a 20% solution of di-methylamine in alcohol are heated together in an autoclave at 120 to 135° C., for 20 hours. The reaction product is isolated by direct filtration or it may be isolated by first drowning in water followed by filtration. The product is essentially the same as the material obtained in Example 13. It also contains small amounts of unreacted material.

*Example 15*

To 150 parts of naphthalene at 125° C. there are added 90 parts of flaked potassium hydroxide. The temperature is then raised to 150° C. and 30 parts of bis-dimethylamino-2,2'-dibenzanthronyl are slowly added. The reaction mass is heated to 219° C. and refluxed at this temperature for 1 hour. It is then cooled to 180° C., diluted with 300 parts of ortho-dichlorobenzene and filtered at 80° C. The cake is washed with ortho-dichlorobenzene. The cake so obtained was subjected to steam distillation to remove ortho-dichlorobenzene, and was then oxidized with air, and filtered. The resulting filter cake was washed free of alkali and dried. The product so obtained dyes cotton from a violet alkaline hydrosulfite vat in greenish gray to black shades (3.63% N).

The nitrodibenzanthronyls employed in the preparation of the tertiary alkylaminodibenzanthronyls or tertiary alkylamino-dibenzanthrones of this invention may be prepared by any of the processes described in the prior art. The nitro-compounds employed in the above examples to illustrate the preparation of the dialkylamino-dibenzanthronyls, and -dibenzanthrones were all produced by direct nitration in nitrobenzene. However, other organic solvents, or sulfuric acid may be employed in place of nitrobenzene. The mono-, as well as higher nitro-derivatives may be used.

These new dyestuffs may be converted to the water soluble leuco sulfuric acid esters by the usual methods. They may be employed as vat dyes or as pigments for use in printing compositions including lacquer printing for textiles, etc.

I claim:

1. A compound of the class consisting of dialkylamino-dibenzanthrones and dialkylolamino-dibenzanthrones.
2. A dialkylaminodibenzanthrone.
3. A bisdialkylaminodibenzanthrone.
4. A dialkylolaminodibenzanthrone.
5. A bisdimethylaminodibenzanthrone.
6. A bisdiethanolaminodibenzanthrone.
7. A bisdiethylaminodibenzanthrone.
8. The process for preparing dyestuffs of the dibenzanthrone series which comprises the steps of heating a dinitrodibenzanthronyl with a secondary dialkylamine until reaction is completed, and heating the resulting bisdialkylaminobenzanthronyl with an alkaline condensing agent to convert the same to a dibenzanthrone.

MYRON S. WHELEN.